(No Model.)
H. WELCKER.
ELECTRIC EYEGLASSES.
No. 408,151. Patented July 30, 1889.
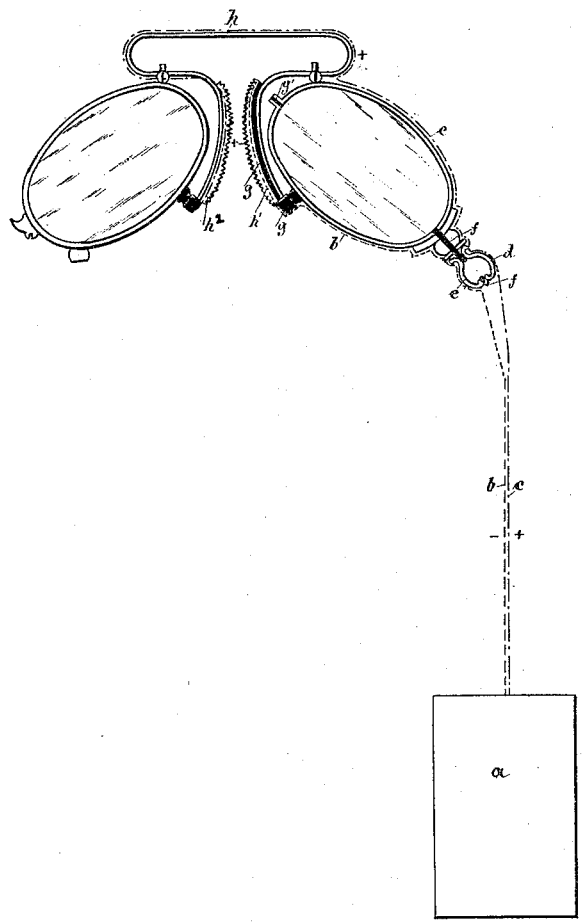

United States Patent Office.

HERMANN WELCKER, OF BERLIN, GERMANY.

ELECTRIC EYEGLASSES.

SPECIFICATION forming part of Letters Patent No. 408,151, dated July 30, 1889.

Application filed April 25, 1889. Serial No. 308,508. (No model.)

*To all whom it may concern:*

Be it known that I, HERMANN WELCKER, a subject of the King of Prussia, residing at Berlin, in the Kingdom of Prussia, Germany, have invented new and useful Improvements in Eyeglasses for Conducting an Electric Current Through the Nose, of which the following is a specification.

This invention relates to eyeglasses for conducting an electric current through the nose, the novel construction of said device being pointed out in the following specification and claims, and illustrated in the accompanying drawing, which represents a face view of eyeglasses constructed according to my invention.

When a person has caught a cold, the mucous membrane of the nose is inflamed, and in consequence thereof the nasal conduits will after a short time be obstructed, particularly on the bridge of the nose, owing to puffy prominences produced by the secretions, which affect the mucous membrane and are a great nuisance to the patient. I have found that by preventing the formation of these prominences the course of the disease will be essentially accelerated, and the indisposition will pass off much more rapidly than usual. As a means for preventing the formation of obstructions in the nasal conduits, I use electricity, and I attain my object by conducting a current of electricity transversely through the bridge of the nose, whereby concretions of the mucous membrane are effectually prevented. The weak current fit for this purpose may be produced by any proper means, and it may be led to the nose by means of any suitable insulating apparatus. The apparatus which I use for this purpose consists of eyeglasses such as illustrated in the drawing. The nose-plates $h'$ $h^2$ of this eyeglass are made of metal and insulated from each other, and the nose-plate $h'$ connects by means of a wire or metallic chain $b$ with the negative pole of a battery element $a$, while the nose-plate $h^2$ connects by a wire or metallic chain $c$ with the positive pole of the same element.

If the frame A of the eyeglasses is made of metal, that portion of said frame which carries the ring or handle is made in two sections, which are insulated from each other by plates $f$ $g$, of ebonite or equivalent material. In this case the chain $b$ can be attached to the section $e$ of the handle and made to extend from there to the nose-plate $h'$, while the chain $c$ is attached to the section $d$ of the handle and made to extend from there over the bow-spring $h$ to the nose-plate $h^2$. If the battery element $a$ is carried in the vest-pocket, the chains $b$ $c$ serve not only as electric conductors, but they also take the place of the band or chain usually employed for securing the eyeglasses.

When the eyeglasses are put on, the electric current from one nose-plate to the other will be closed transversely through the bridge of the nose and the formation of obstructions in the nasal conduits will be prevented, as above stated.

What I claim as new, and desire to secure by Letters Patent, is—

1. The combination, with an eyeglass-frame comprising a bow-spring $h$, of the opposite nose-plates $h'$ $h^2$, insulated from each other by an insulating-plate $g$ between one nose-plate and the frame, a battery element $a$, an electric conductor $b$, connecting one pole of the battery with one nose-plate, and an electric conductor $c$, connecting the other pole of the battery with the opposite nose-plate, substantially as described.

2. The combination, with an eyeglass-frame comprising the bow-spring $h$, of two opposite nose-plates carried by said spring and insulated from each other, an electric conductor $c$, passing along the upper side of the frame and along the bow-spring to one nose-plate, and an electric conductor $b$, passing along the lower side of the frame direct to the opposite nose-plate, substantially as described.

3. In eyeglasses, the combination, with a sectional frame, of insulating-plates $f$ $g'$, the bow-spring $h$, in metallic connection with one of the frame-sections, the nose-plate $h'$, insulated from the bow-spring, the nose-plate $h^2$, in metallic connection with the bow-spring, and the electric conductors $b$ $c$, substantially as described.

In testimony whereof I have signed my name to this specification in the presence of two subscribing witnesses.

HERMANN WELCKER.

Witnesses:
L. GLASER,
G. HÜLSMANN.